US006852805B2

(12) United States Patent
Hochgesang

(10) Patent No.: US 6,852,805 B2
(45) Date of Patent: Feb. 8, 2005

(54) SOLVENTLESS LIQUID FKM COMPOUNDS

(75) Inventor: Paul J. Hochgesang, Ann Arbor, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 37 days.

(21) Appl. No.: 10/328,740

(22) Filed: Dec. 23, 2002

(65) Prior Publication Data

US 2003/0135001 A1 Jul. 17, 2003

Related U.S. Application Data

(60) Provisional application No. 60/342,243, filed on Dec. 21, 2001.

(51) Int. Cl.$^7$ ................................................. C08F 8/00
(52) U.S. Cl. .................... 525/326.2; 525/326.3
(58) Field of Search ........................... 525/326.2, 326.3

(56) References Cited

U.S. PATENT DOCUMENTS

| | | | |
|---|---|---|---|
| 3,931,074 A | 1/1976 | Gomez | 260/23 |
| 4,048,261 A | 9/1977 | Starmer | 260/888 |
| 4,355,139 A | 10/1982 | Coran et al. | 525/133 |
| 4,421,884 A | 12/1983 | Oyama et al. | 524/209 |
| 4,486,480 A | 12/1984 | Okumoto et al. | 428/36 |
| 4,603,175 A * | 7/1986 | Kawachi et al. | 525/276 |
| 4,654,404 A | 3/1987 | Watanabe et al. | 525/315 |
| 4,696,984 A | 9/1987 | Carbonaro et al. | 526/98 |
| 4,833,195 A | 5/1989 | Adur et al. | 524/528 |
| 4,843,128 A | 6/1989 | Cesare | 525/193 |
| 4,921,912 A | 5/1990 | Sagawa et al. | 525/112 |
| 4,960,829 A | 10/1990 | Allen et al. | 525/193 |
| 5,000,981 A | 3/1991 | McGarry et al. | 427/44 |
| 5,068,275 A | 11/1991 | Wiseman | 524/314 |
| 5,080,942 A | 1/1992 | Yau | 428/349 |
| 5,149,895 A | 9/1992 | Coolbaugh et al. | 585/507 |
| 5,239,000 A | 8/1993 | Kim et al. | 525/133 |
| 5,288,937 A | 2/1994 | Coolbaugh et al. | 585/507 |
| 5,387,730 A | 2/1995 | Coolbaugh et al. | 585/10 |
| 5,510,548 A | 4/1996 | Coolbaugh et al. | 585/12 |
| 5,545,783 A | 8/1996 | Coolbaugh et al. | 585/12 |
| 5,548,028 A | 8/1996 | Tabb | 525/194 |
| 5,551,707 A | 9/1996 | Pauley et al. | 277/233 |
| 5,625,100 A | 4/1997 | Coolbaugh et al. | 585/12 |
| 5,633,341 A | 5/1997 | Abend | 528/335 |
| 5,844,021 A | 12/1998 | Koblitz et al. | 523/173 |
| 5,844,047 A | 12/1998 | Abend | 525/327.7 |
| 5,912,288 A | 6/1999 | Nishimoto et al. | 524/114 |
| 5,958,530 A | 9/1999 | Jeitner | 428/35.7 |
| 6,120,869 A | 9/2000 | Cotsakis et al. | 428/42.3 |
| 6,162,847 A | 12/2000 | Fujimoto et al. | 524/120 |
| 6,214,922 B1 | 4/2001 | Campomizzi | 524/511 |
| 6,232,403 B1 | 5/2001 | Blumler et al. | 525/191 |
| 6,238,787 B1 | 5/2001 | Giles et al. | 428/343 |
| 6,265,474 B1 | 7/2001 | Fujimoto et al. | 524/120 |
| 6,268,056 B1 | 7/2001 | Mills | 428/416 |
| 6,291,374 B1 | 9/2001 | Landi | 442/237 |
| 6,468,463 B1 * | 10/2002 | Osawa | 264/328.1 |

* cited by examiner

Primary Examiner—Bernard Lipman
(74) Attorney, Agent, or Firm—Ronald W. Wangarow; Gary M. Sutter

(57) ABSTRACT

This invention relates to a solventless liquid FKM compound. The compound includes a liquid FKM rubber. The compound also includes a nonsulfur curing agent. The curing agent is present in an amount of at least about 5% by weight of the compound. The compound contains substantially no solvent.

14 Claims, No Drawings

SOLVENTLESS LIQUID FKM COMPOUNDS

CROSS-REFERENCE TO RELATED APPLICATION

This application claims the benefit of U.S. provisional application Ser. No. 60/342,243, filed Dec. 21, 2001.

BACKGROUND OF THE INVENTION

This invention relates in general to elastomeric compositions, and in particular to compounds made with a liquid FKM rubber.

Liquid FKM rubbers are conventionally used in a minor amount as a plasticizer or processing aid in combination with a solid elastomer in preparing a rubber compound. It has not previously been thought to use a liquid FKM rubber as the base elastomer for making a compound, and then to cure the liquid FKM rubber.

Rubber compounds are conventionally made by mixing the elastomer(s) and other chemicals together in an organic solvent, or in an aqueous solvent to prepare an emulsion. It has not previously been thought to prepare a liquid FKM rubber compound without the use of a solvent, and there has been no suggestion how to prepare the compound in a solventless process. Such a process is contrary to the conventional thinking.

SUMMARY OF THE INVENTION

This invention relates to a solventless liquid FKM compound. The compound includes a liquid FKM rubber. The compound also includes a nonsulfur curing agent. The curing agent is present in an amount of at least about 5% by weight of the compound. The compound contains substantially no solvent.

Various objects and advantages of this invention will become apparent to those skilled in the art from the following detailed description of the preferred embodiment.

DETAILED DESCRIPTION OF THE PREFERRED EMBODIMENT

The liquid FKM compounds of the invention use liquid FKM rubbers as the base material for the compounds. Surprisingly, the compounds are made with substantially no solvent, e.g., not more than about 2% solvent. It has been discovered that liquid FKM compounds having excellent properties can be made without solvent by using an increased amount of curing agent compared to conventional methods.

The solventless liquid FKM compounds of the invention contain a liquid FKM rubber, a curing agent, and optionally other curing chemicals and other compounding ingredients as described below.

The Liquid FKM Rubber

The liquid FKM rubber can be any suitable type of liquid fluoroelastomer. One nonlimiting example is a Dai-el® G-101 liquid fluoroelastomer manufactured by Daikin Industries, Ltd., Orangeburg, N.Y. and Osaka, Japan. This fluoroelastomer is a vinylidene fluoride-propylene hexafluoride-ethylene tetrafluoride terpolymer. Preferably, the liquid FKM rubber is present in an amount between about 50% and about 97% by weight of the compound.

Optional Solid Elastomer

In some applications, it may be desirable to add to the compound a solid fluoroelastomer having a Mooney value of not more than about 75. A low Mooney fluoroelastomer can be added to improve the physical properties of the liquid FKM without substantial loss in its flowability and processability. Preferably, the amount of the solid fluoroelastomer is not more than about 49% by weight of the total fluoroelastomer.

The Curing Agent

The curing agent can be any type of non-sulfur curing agent suitable for curing the liquid FKM rubber. Some nonlimiting examples of curing agents include peroxides, bisphenols, metal oxides, and amines. Any suitable type of peroxide curing agent can be used. Some nonlimiting examples of peroxide curing agents are Varox® DBPH-50, a 50% 2,5-dimethyl-2,5-di(t-butyl-peroxyl)hexane manufactured by R. T. Vanderbilt Co., Norwalk, Conn.; Vul-Cup® 40KE manufactured by Hercules, Inc., Wilmington, Del.; Cadox® TS-50 manufactured by Akzo Chemical, Chicago, Ill.; and MEK (methyl ethyl ketone) peroxides. Any suitable type of bisphenol or other non-sulfur curing agent can be used.

The liquid FKM compounds contain an increased amount of curing agent compared to conventional rubber compounds. The curing agent is usually present in an amount of at least about 5% by weight of the compound, and preferably between about 5% and about 12%.

Other Curing Chemicals

The compounds can also optionally include other curing chemicals, such as activators and/or crosslinking enhancers. Any suitable type of activator can be used. Any suitable type of crosslinking enhancer can be used. A nonlimiting example is TAIC (triallyl isocyanurate), which is manufactured by companies such as Nippon Kasei Chemical, Iwaki, Japan, and Aldrich Chemical Co., Milwaukee, Wis. Another example is Ricon® 152, a homopolymer of butadiene (MW 2,900), which is manufactured by Sartomer, Exton, Pa.

Other Compounding Ingredients

The compounds can also optionally include other compounding ingredients, such as fillers, bonding agents, antidegradants, process oils, plasticizers, coloring agents, or other desirable ingredients. Any suitable type of filler can be used. Some typical fillers are carbon black, silica, and clay. Nonlimiting examples of suitable fillers include Sterling® 6630 carbon black, manufactured by Cabot Corporation, Alpharetta, Ga.; FK140 or FK160 silica manufactured by Degussa AG, Dusseldorf, Germany; and CAB-O-SIL® TS-530, a very hydrophobic fumed silica, manufactured by Cabot Corp.

Any suitable type of bonding agent can be used. Some nonlimiting examples of bonding agents useful in the compounds are resorcinol (1,3-dihydroxybenzene); and A-151, a vinyl triethoxy silane, which is manufactured by Huayuan Fine Chemicals, Wuhan, China.

Optionally, a coloring agent can be added to the compounds. Some nonlimiting examples of coloring agents are man-made mineral pigments such as the Geode® series (e.g., Geode® V-11633 Kelly Green); and the NEOLOR® series of inorganic pigments (e.g., NEOLOR® Red S), both manufactured by Ferro Corp., Cleveland, Ohio.

Processing

The solventless liquid FKM compounds can be processed in any suitable manner. Typically, the chemicals are mixed together using any suitable mixing equipment, such as planetary mixers (e.g., Ross mixers), internal mixers, two-roll mills, open roll mills or the like. The mixed compound is then applied, pressed, or molded depending on the particular use. Then, the compound is cured using any suitable time and temperature profile. Typically, the compound is cured at a temperature between about 300° F. and about 400° F. for a time between about 3 minutes and about 20 minutes.

The compound can be further post cured if desired or necessary, e.g., for 2 to 14 days at 70° F. to 400° F.

Applications

The compounds of the invention can be used in many different applications. Advantageously, the compounds are readily flowable between about 23° C. and about 150° C. so that they can take the place of materials such as liquid silicones in many applications. Preferably, the compounds have a viscosity not more than about 50% greater than that of liquid silicones, more preferably not more than about 25% greater, and most preferably not more than about 10% greater. Unlike liquid silicones, the compounds are impermeable to fluids, so their use is beneficial in applications where it is desired to limit the flow of fluids, such as in engine seals to limit the flow of VOC's through the engine. The compounds are also easier to process than liquid silicones. The flowability of the compounds allows them to be applied instead of molded, which can save the costs typically associated with molding. Of course, the compounds can also be molded if desired, and their use is not limited to flowable applications.

Some nonlimiting examples of typical applications include use as sealing members (e.g., gaskets, O-rings, packings or the like) which can be used in many different applications, such as sealing with respect to engine oil, gear oil, transmission oil, or power steering fluid. For example, the compounds can be used for cure in place gasketing (CIPG), inject in place gasketing (IJPG), and form in place gasketing (FIPG). They can be applied robotically thereby resulting in a dispensed sealing bead. The compounds are suitable for making thin seals such as thin layered gaskets, and for making intricate seals and gaskets. They can be used to fill intricate channels in a metal plate. A thin gasket can be injection molded onto a plastic or metal carrier.

The compounds can be used in liquid injection molding (LIM), transfer molding (TM), injection molding.

The compounds can be used to make rubber-coated metal (RCM) products and rubber-coated plastic products. The compounds cure and bond well to the metal and plastic.

The compounds can be used as a screen printing material. Because of their low viscosity, lower pressures are required during the forming process which allows for complicated manufacturing using pressure sensitive material as an integral part of the forming process.

The compounds can be used as a fabric coating in many different applications, e.g., as a coating on airbags or interior portions of airplanes. The compounds can be used as a repair material, e.g., to fill in little holes in bumpers.

Since the compounds are solventless, they can be easily applied by workers without the hazards of breathing in fumes. The compounds can be applied by any suitable method. The compounds can be applied and will cure at room temperature.

EXAMPLES

Some nonlimiting examples of compounds according to the invention were prepared as follows:

| Dai-el G-101 | 80.0 | 100 |
|---|---|---|
| N990 | 8.0 | 10 |
| VC 50 | 8.0 | 10 |
| MgO | 4.5 | 5 |
| Ca(OH)$_2$ | 8.5 | 10 |

-continued

| Dai-el G-101 | 70.0 | | 70 | |
|---|---|---|---|---|
| MgO | 5.6 | | 8.4 | |
| Ca(OH)$_2$ | 5.6 | | 8.4 | |
| VC 50 | 5.6 | | 8.4 | |

| Dai-el G-101 | 50.0 | 45.0 | 50 | 65 |
|---|---|---|---|---|
| MgO | 6.0 | | 6 | 7.8 |
| Ca(OH)$_2$ | 6.0 | | 6 | 7.8 |
| VC 50 | 6.0 | | 6 | 7.8 |
| 6630 | 25.0 | 25.0 | 5 | 6.5 |
| ZnO | | 0.75 | | |
| Varox | | 6.0 | | |
| B5405 | | 1.0 | | |
| KBM-7803 | | 5.0 | | |

| Dai-el G-101 | 65 | 60 | 60 | |
|---|---|---|---|---|
| MgO | 7.8 | 7.2 | 7.2 | |
| Ca(OH)$_2$ | 7.8 | 7.2 | 7.2 | |
| VC 50 | 7.8 | 7.2 | 7.2 | |
| 990 | 9.8 | 15 | 18 | |

| Dai-el G-101 | 60.0 | 60.0 | | |
|---|---|---|---|---|
| FK-140 | 12.0 | 12.0 | | |
| KB 7003 | 3.6 | 3.6 | | |
| ZnO | 0.75 | 7.2 | | |
| TIAC | 6.0 | 7.2 | | |
| Varox | 6.0 | 7.2 | | |

| Dai-el G-101 | 60.0 | 60.0 | | |
|---|---|---|---|---|
| MgO | 9.0 | 9.0 | | |
| N 990 | 12.0 | 12.0 | | |
| PIAK No. 1 | 8.0 | 10.0 | | |

| Dai-el G-101 | 60 | 60 | 50 | 50 |
|---|---|---|---|---|
| MgO | 7.2 | 7.2 | 6 | 6 |
| VC 50 | 7.2 | 7.2 | 6 | 6 |
| N-990 | 12 | 12 | 10 | 10 |
| Ca(OH)$_2$ | 7.2 | 7.2 | 6 | 6 |
| Regrind | — | 6 | 10 | 20 |

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A liquid FKM composition, comprising:
   (a) at least 40 weight percent vinylidene fluoride-propylene hexafluoride terpolymer liquid FKM rubber; and
   (b) at least 5 weight percent non-sulfur curing agent, said curing agent for curing said vinylidene fluoride-propylene hexafluoride terpolymer liquid FKM rubber;
   wherein the composition readily flows from about 23 degrees C. to about 150 degrees C. and has not more than 2 weight percent solvent.

2. A composition according to claim 1 wherein the curing agent is a peroxide.

3. A composition according to claim 1 wherein the curing agent is a bisphenol.

4. A composition according to claim 1 wherein the curing agent is from about 5% to about 12% by weight of the composition.

5. A composition according to claim 1 further comprising solid fluoroelastomer having a Mooney value of not more than 75.

6. A composition according to claim 5 wherein the solid fluoroelastomer is not more than 49% by weight.

7. A composition according to claim 1 wherein said composition is curable at room temperature.

8. A sealing member made of material cured from a composition according to claim 1.

9. A gasket made of material cured from a composition according to claim 1 wherein said gasket is selected from the group consisting of a cure in place gasket (CIPG), an inject in place gasket (IJPG), and a form in place gasket (FIPG).

10. A composition according to claim 1 wherein said composition provides a molding material for use in a molding process selected from the group consisting of a liquid injection molding (LIM) process, a transfer molding (TM) process, and an injection molding process.

11. A composition according to claim 1 wherein said composition provides a coating material for making a product selected from the group consisting of a rubber-coated metal product, a rubber-coated plastic product, and a rubber-coated fabric product.

12. A liquid FKM composition comprising:
 (a) at least 40 weight percent vinylidene fluoride-propylene hexafluoride terpolymer liquid FKM rubber; and
 (b) at least 5 weight percent peroxide curing agent, said curing agent for curing said vinylidene fluoride-propylene hexafluoride terpolymer liquid FKM rubber;
 wherein the composition readily flows from about 23 degrees C. to about 150 degrees C. and has not more than 2 weight percent solvent.

13. A sealing member made of material cured from a composition according to claim 12.

14. A gasket made of material cured from a composition according to claim 12 wherein said gasket is selected from the group consisting of a cure in place gasket (CIPG), an inject in place gasket (IJPG), and a form in place gasket (FIPG).

* * * * *